US009962302B2

(12) United States Patent
Lau

(10) Patent No.: US 9,962,302 B2
(45) Date of Patent: May 8, 2018

(54) MANUAL STAIR CLIMBING WHEEL CHAIR

(71) Applicant: Shu Lam Lau, Hong Kong (HK)

(72) Inventor: Shu Lam Lau, Hong Kong (HK)

( * ) Notice: Subject to any disclaimer, the term of this patent is extended or adjusted under 35 U.S.C. 154(b) by 20 days.

(21) Appl. No.: 15/255,168

(22) Filed: Sep. 2, 2016

(65) Prior Publication Data

US 2017/0079861 A1 Mar. 23, 2017

(30) Foreign Application Priority Data

Sep. 21, 2015 (CN) .......................... 2015 1 0603777
Sep. 21, 2015 (CN) ..................... 2015 2 0733861 U

(51) Int. Cl.
*B62B 5/02* (2006.01)
*A61G 5/06* (2006.01)
*A61G 5/10* (2006.01)
*A61G 5/04* (2013.01)

(52) U.S. Cl.
CPC ............. *A61G 5/061* (2013.01); *A61G 5/048* (2016.11); *A61G 5/06* (2013.01); *A61G 5/1075* (2013.01)

(58) Field of Classification Search
CPC ...... A61G 5/061; A61G 5/1075; A61G 5/048; A61G 5/06
See application file for complete search history.

(56) References Cited

U.S. PATENT DOCUMENTS 4,108,449 A * 8/1978 Rhodes .................. A61G 5/022 180/8.2
4,962,942 A * 10/1990 Barnett .................. A61G 5/023 280/250.1
5,395,129 A * 3/1995 Kao ....................... A61G 5/061 180/8.2
7,396,023 B2 * 7/2008 Vlk ........................ A61G 5/065 280/249
2005/0279540 A1 * 12/2005 Wisner ..................... A61G 5/10 180/65.1
2015/0137548 A1 * 5/2015 Purdue ................ A61G 5/1075 296/65.08
2015/0231002 A1 * 8/2015 Gierse ................. A61G 5/1059 297/344.16

FOREIGN PATENT DOCUMENTS

CN 2580934 Y 10/2003

* cited by examiner

*Primary Examiner* — Anne Marie M Boehler
*Assistant Examiner* — Marlon A Arce
(74) *Attorney, Agent, or Firm* — Spruson & Ferguson (Hong Kong) Limited

(57) ABSTRACT

The present invention provides a manual stair climbing wheel chair. The wheel chair comprises a hand crank handle, seat reclining devices, a gear box and a driven sprocket wheel set. When the seat of the wheel chair is reclined by using the seat reclining devices, the front and rear wheels of the wheel chair are only driven by the gear box through the driven sprocket wheel set, and cannot be pushed or propelled by hands; the person propelling the wheel chair can drive the front and rear wheels only by rotating the hand crank handle, so that self-slippage of the wheel chair can be avoided when moving up and down on stairs.

11 Claims, 13 Drawing Sheets

MANUAL STAIR CLIMBING WHEEL CHAIR

CROSS-REFERENCES TO RELATED APPLICATIONS

This application claims priority from a Chinese utility model application number 201520733861.0 filed on Sep. 21, 2015 and a Chinese invention patent application number 201510603777.1 filed on Sep. 21, 2015, and the disclosures of which are incorporated by reference in their entirety.

TECHNICAL FIELD

The present invention relates to a wheel chair, particularly to a manual stair climbing wheel chair.

BACKGROUND OF THE INVENTION

Due to the gradual ageing of populations in many countries and regions, most of the elderly need to use a wheel chair as their daily means of transport, but stairs are often obstacles to those in wheel chairs; to bypass such obstacles, they usually have to travel a long distance to reach their destinations; even worse is when there is no other access, the wheel chair must be manually moved, e.g., up and down the stairs, under the assistance by several people.

Electric wheel chair may be able to solve the above problem of moving up and down on stairs, but it is complicated in structure and expensive, and many consumers can not afford it. In addition, when an electric wheel chair goes up and down on stairs, safety is also a big problem.

A Chinese utility model patent (Publication No.: CN2580934Y) disclosed an obstacle-free and self-propelling wheel chair, which is provided with left and right plastic wheels and a multi-directional guiding wheel for travelling on a horizontal plane and climbing a small slope, and also provided with four spider wheels for moving up on stairs. When such wheel chair is used for moving up the stairs, a pull bar needs to be pulled, the right and left plastic wheels and the multi-directional guiding wheel are lifted up accordingly through a connecting rod and under leverage, whilst the seat of the wheel chair is being changed into a reclined position. At that time, the four spider wheels come into contact with the tread of the stairs, and the pull bar needs to be pushed down in order to transmit the driving force to the longitudinal shaft, and through worm gear assemblies to reduce speed, a larger driving force can be exerted to drive a simultaneous rotation of the four spider wheels for an up and down movement on stairs. However, due to varying lengths and widths among different treads of the stairs, the spider wheels are prone to slip over the edge of the treads, resulting in a safety problem. In addition, the structure of a spider wheel is quite complicated, so that the production cost is relatively high.

SUMMARY OF THE INVENTION

One object of the present invention is to provide a manual stair climbing wheel chair, which allows a person propelling the wheel chair to move the wheel chair up and down on stairs safely with limited effort.

According to one embodiment of the present invention, a manual stair climbing wheel chair is provided, comprising a seat, front and rear wheels, seat reclining devices which are connected with the seat and used to recline the seat, a gear box including gear wheels, a hand crank handle which is connected mechanically with the gear box, a driven sprocket wheel set, including driven sprocket wheels and a recess, and the driven sprocket wheel set is connected to the front wheels and the rear wheels, and the recess is disposed between two of the driven sprocket wheels, wherein when the seat of the wheel chair is reclined by using the seat reclining devices, the gear wheels of the gear box are disposed in the recess of the driven sprocket wheel set and engage with the driven sprocket wheels, so that the front and rear wheels are driven by the gear box.

Preferably, the gear box further comprises a driver gear wheel which is connected to the hand crank handle through a chain. The hand crank handle also comprises a crank gear wheel, and the crank gear wheel is connected with the chain.

Preferably, the gear ratio of the gear box is 1:30 to 1:40.

Preferably, after adjustment by the seat reclining devices, the seat is reclined at an angle of 35-45 degrees with respect to the horizontal plane.

Preferably, each of the seat reclining devices includes a clutch handle, toothed plate, positioning plate for toothed plate and clutch teeth. The clutch handle is disposed under the wheel chair handles.

In the present invention, the front and rear wheels can be driven through the gear ratio of the gear box. After the gear is shifted by the gear box, the front and rear wheels are locked and cannot be moved or self-propelled by hands, but can only be driven by hand through rotating the hand crank handle, such that self-slippage of the wheel chair can be avoided when it moves up and down on stairs, and thereby it is very safe. It is because a greater torque can be generated after the gear box is connected to the front and rear wheels, the person propelling the wheel chair can propel the wheel chair up and down on stairs with very limited effort. Additionally, the person propelling the wheel chair can recline the seat of the wheel chair simply by using the seat reclining devices such that the wheel chair can move up and down on stairs by rotating the hand crank handle. As such, the wheel chair is easy to operate. The manual stair climbing wheel chair according to the present invention is also simple in structure with low production costs.

BRIEF DESCRIPTION OF THE DRAWINGS

By reference to the accompanying drawings, the present invention will be better understood by those skilled in the art, and the advantages of the present invention will become more apparent. The accompanying drawings described herein are only intended to illustrate the selected embodiments rather than all possible embodiments, and not to limit the scope of the present invention.

DETAILED DESCRIPTION OF THE PREFERRED EMBODIMENTS

Figure 1A:
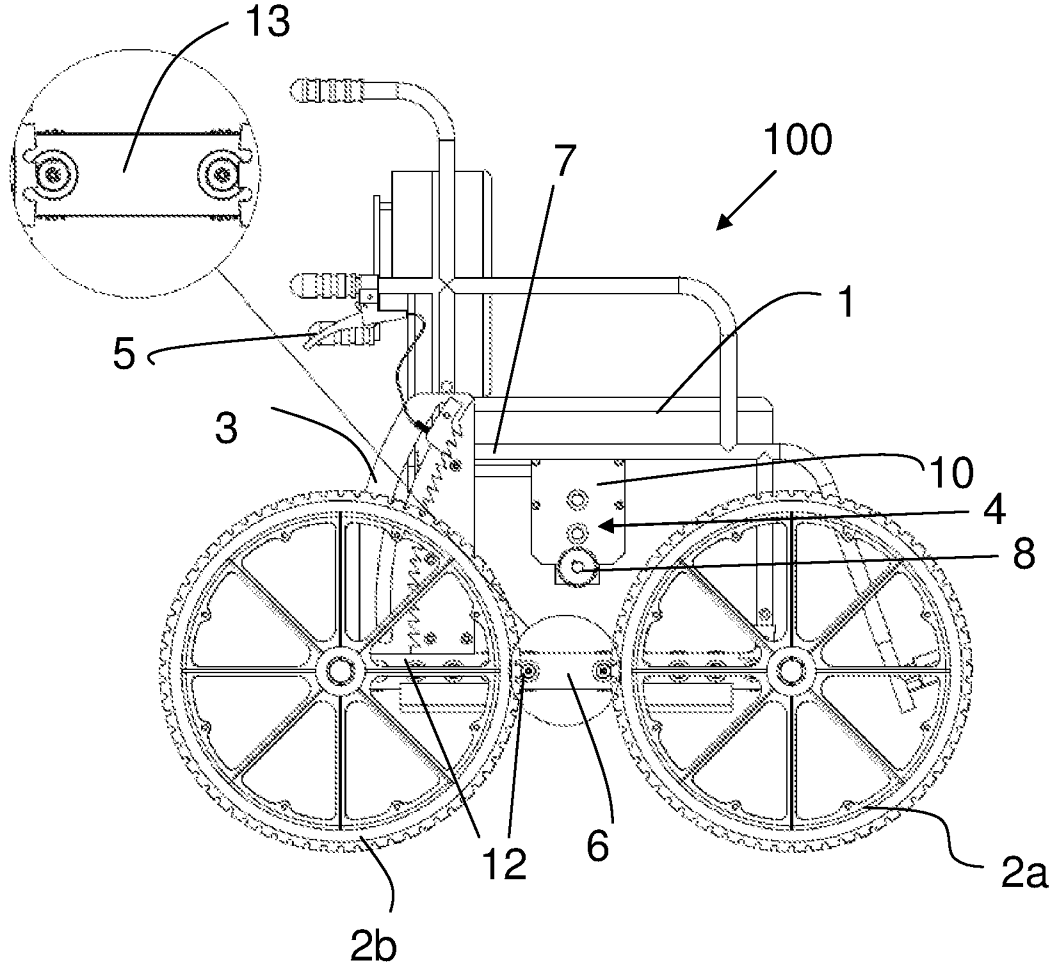
FIG. 1A is the left view of the manual stair climbing wheel chair being operated on a horizontal plane according to one embodiment of the present invention.
Figure 1B:
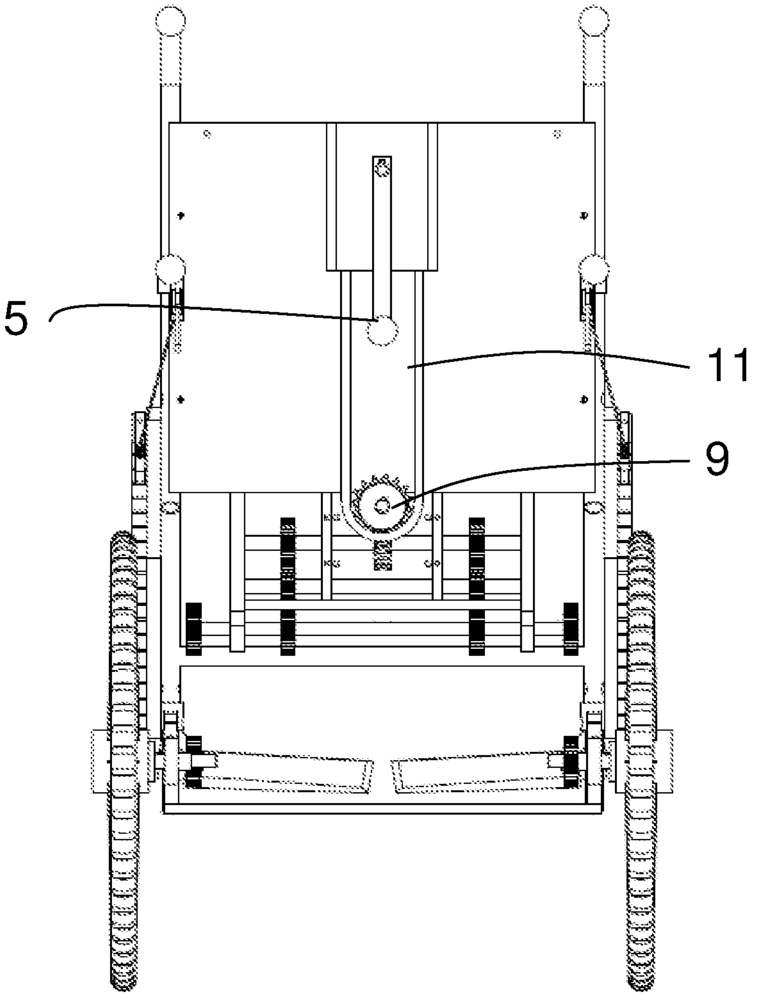
FIG. 1B is the rear view of the manual stair climbing wheel chair according to one embodiment of the present invention.
Figure 1C:
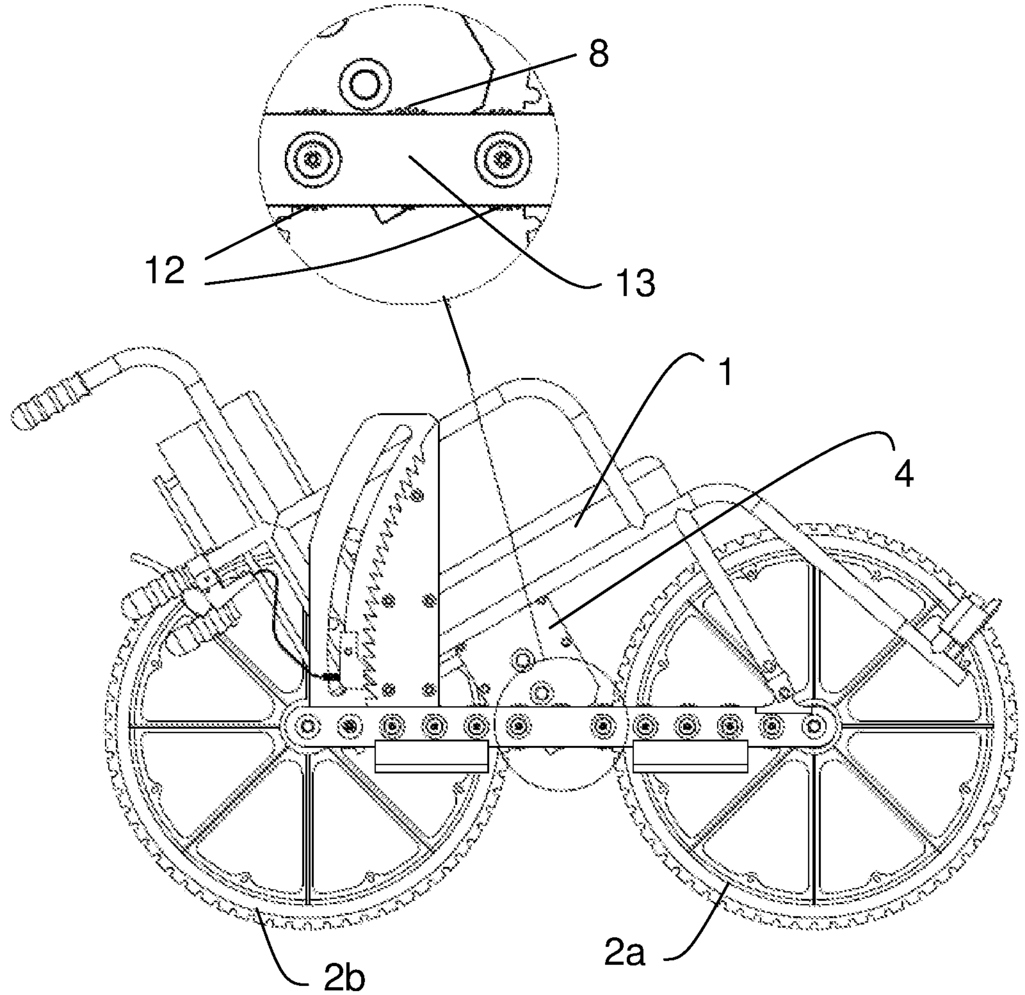
FIG. 1C is the left view of the manual stair climbing wheel chair moving up and down on stairs according to one embodiment of the present invention.

As shown in FIG. 1A and FIG. 1B, the manual stair climbing wheel chair (100) includes a seat (1), two front wheels (2*a*), two rear wheels (2*b*), two seat reclining devices (3), a gear box (4), a hand crank handle (5) and two driven sprocket wheel sets (6). As shown in FIG. 1C, the two front wheels (2*a*) are disposed on the left and right sides of the seat (1), respectively; and the two rear wheels (2*b*) are also disposed on the left and right sides of the seat (1), respectively. The two seat reclining devices (3) are disposed on the left and right sides of the seat (1), respectively, and connected to the seat (1) and the wheel chair bracket (7) for reclining the seat (1). The gear box (4) is disposed at the bottom of the seat (1), and includes two gear wheels (8) and one driver gear wheel (9). The two gear wheels (8) are respectively disposed on the left and right sides of the gear box housing (10), and the driver gear wheel (9) is disposed behind the gear box housing (10). The hand crank handle (5) is disposed behind the seat (1), and connected to the driver gear wheel (9) through a chain (11). The driven sprocket wheel sets (6) are composed of a plurality of driven sprocket wheels (12) which are connected to each other, and disposed on the left and right sides of the seat (1). The driven sprocket wheel sets (6) are connected to the front wheels (2*a*) and rear wheels (2*b*) for driving the front wheels (2*a*) and rear wheels (2*b*), respectively. As shown in the enlarged view of FIG. 1A, the left driven sprocket wheel set (6) further comprises a recess (13) which is disposed between two of the driven sprocket wheels (12).

When the wheel chair (100) needs to move up and down on stairs, the seat (1) can be reclined through the seat reclining devices (3). As shown in FIG. 1C, when the seat (1) is reclined, the gear wheels (8) of the gear box (4) are disposed in the recess (13) of the driven sprocket wheel sets (6), respectively, and engage with the driven sprocket wheels (12) (as shown in the enlarged view of FIG. 1C), so that the front wheels (2*a*) and rear wheels (2*b*) are driven by the gear box (4). The front wheels (2*a*) and rear wheels (2*b*) are thereby locked which cannot be pushed or self-propelled by hands, but can only be driven by hand through rotating the hand crank handle (5) in order to increase torque to drive the front wheels (2*a*) and rear wheels (2*b*) for moving up and down on stairs.

Figure 2:
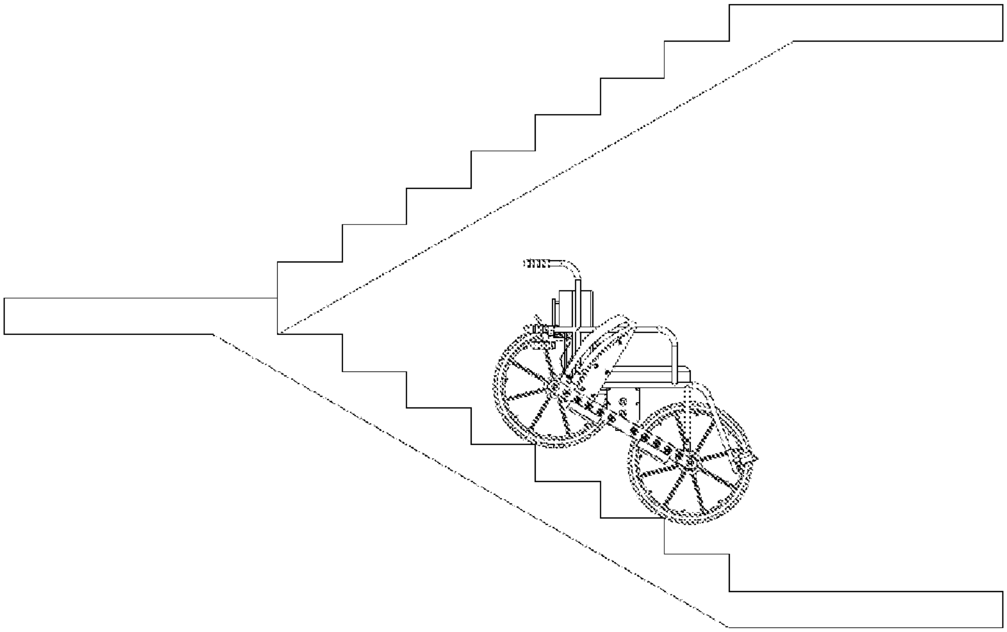
FIG. 2 is a schematic diagram of the manual stair climbing wheel chair moving down the stairs according to one embodiment of the present invention.

FIG. 2 is a schematic diagram of the manual stair climbing wheel chair moving down the stairs according to one embodiment of the present invention. In this example, since the seat is reclined by the seat reclining devices of the present invention, the person sitting on the seat of the wheel chair does not lean forward.

In the present invention, the front and rear four wheels can be driven through the gear ratio of the gear box. After the gear is shifted by the gear box, the four wheels are locked and cannot be moved or self-propelled by hands, but can only be driven by hand through rotating the hand crank handle, such that self-slippage of the wheel chair can be avoided when moving up and down on stairs, and thereby it is very safe.

Preferably, after adjustment by the seat reclining devices, the seat is reclined at an angle of 35-45 degrees with respect to the horizontal plane, so as to prevent the center of gravity of the person sitting on the seat of the wheel chair from leaning forward when the wheel chair moves down the stairs.

Preferably, the hand crank handle is disposed behind the seat, so as to facilitate the person propelling the wheel chair to rotate the hand crank handle to move the wheel chair up and down on stairs.

Preferably, the gear ratio of the gear box is 1:30 to 1:40, so as to increase the torque transferred by the gear box to the front and rear wheels, while providing a high speed of moving up and down on stairs.

Preferably, the front and rear wheels include anti-slip tires.

Figure 3A:
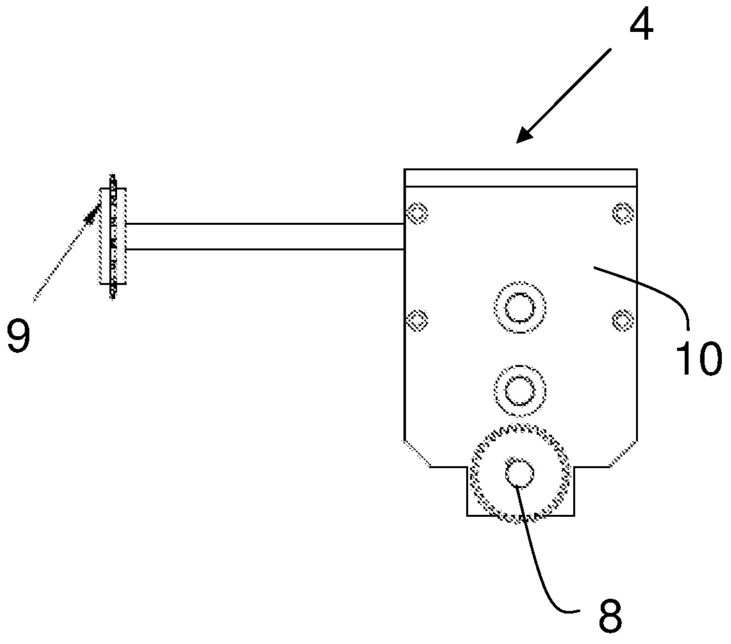
FIG. 3A is the right view of the gear box according to one embodiment of the present invention.
Figure 3B:
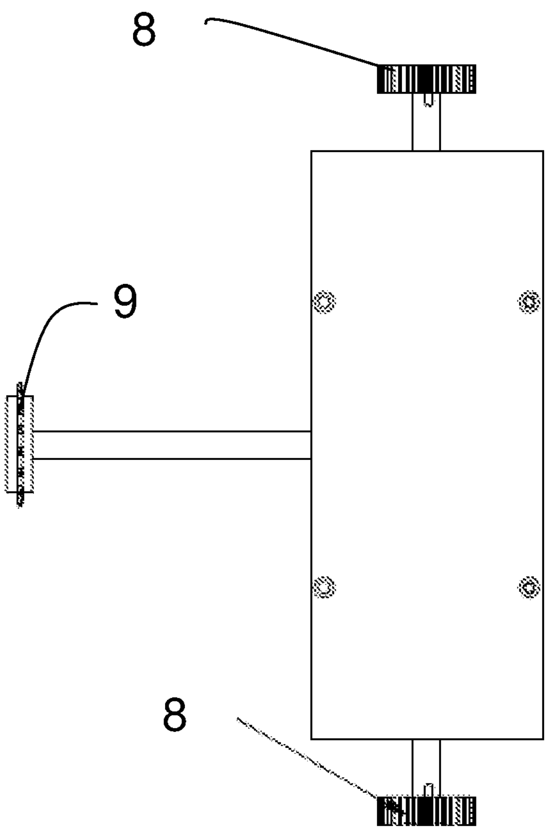
FIG. 3B is the top view of the gear box according to one embodiment of the present invention.
Figure 3C:
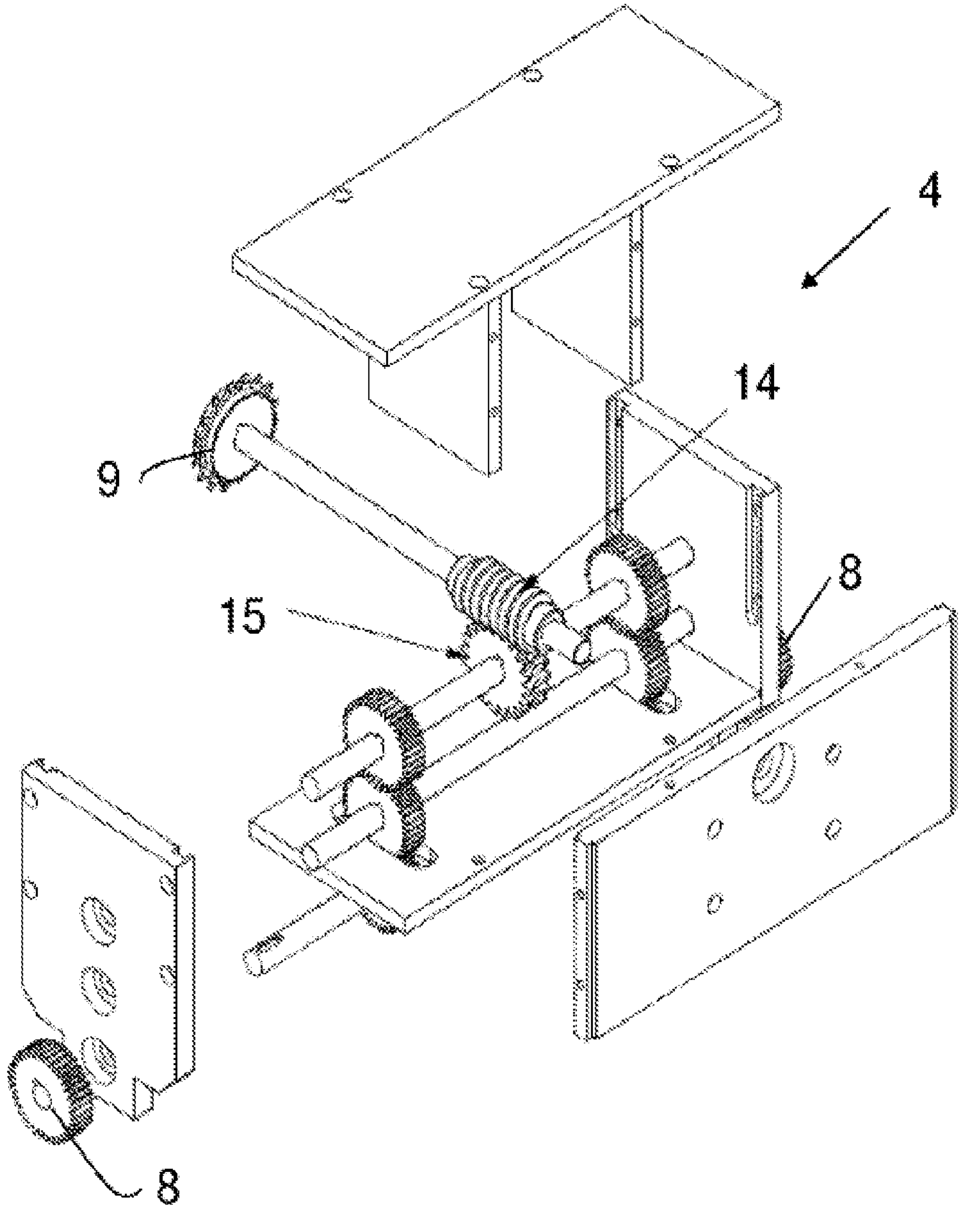
FIG. 3C is the exploded view of the gear box according to one embodiment of the present invention.

According to one embodiment of the present invention, as shown in FIG. 3A and FIG. 3B, the gear box (4) includes two gear wheels (8) and the driver gear wheel (9). The two gear wheels (8) are respectively disposed on the left and right sides of the gear box housing (10), and the driver gear wheel (9) is disposed behind the gear box housing (10). As shown in FIG. 3C, the gear box (4) further comprises a worm (14) and a worm gear set (15). The worm (14), the driver gear wheel (9) and the worm gear set (15) are connected together, and the worm gear set (15) is connected to the two gear wheels (8). As such, when the driver gear wheel (9) is driven, the two gear wheels (8) are also driven. One advantage of the structure is that the gear box can be strengthened to prevent self-slippage of the wheel chair from slippage of the front and rear wheels when moving up and down on stairs as in the conventional wheel chair. In addition, the torque of the gear box can be increased.

Figure 4A:
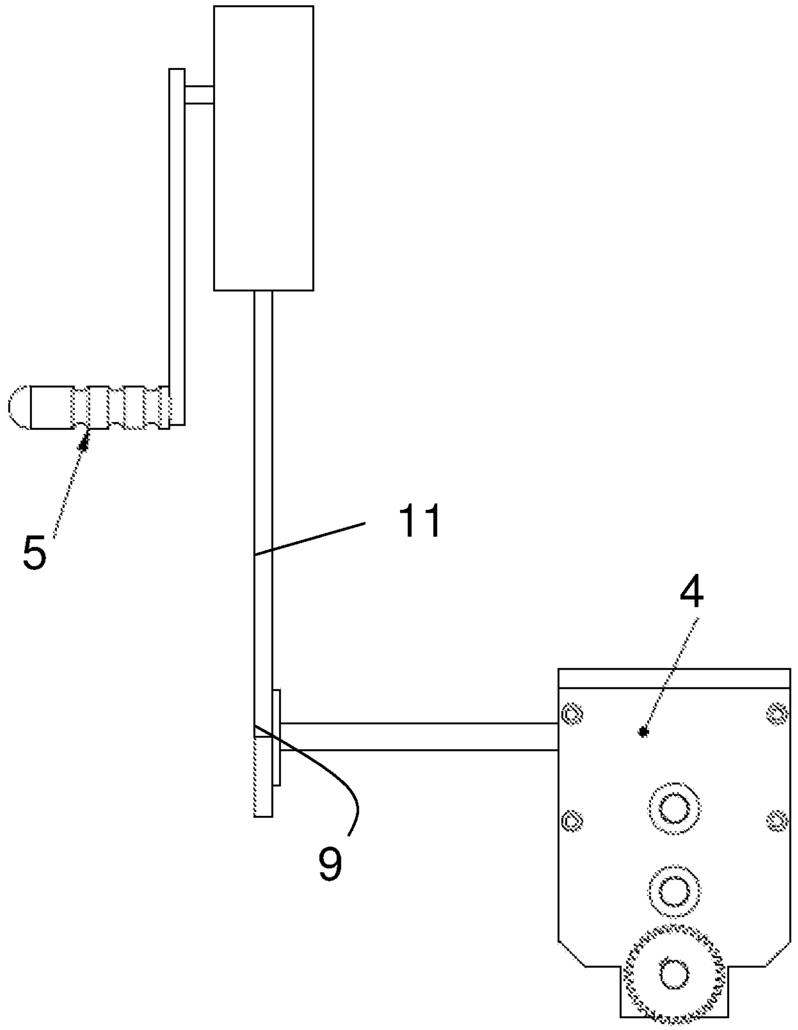
FIG. 4A is the left view of the hand crank handle and the gear box according to one embodiment of the present invention.
Figure 4B:
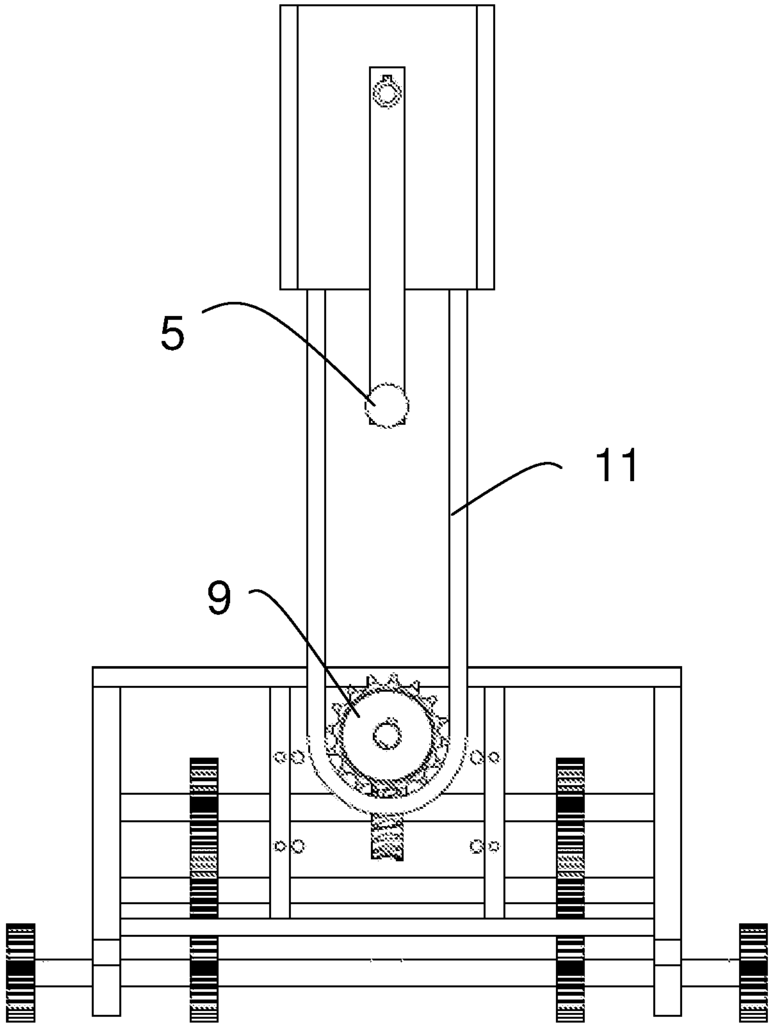
FIG. 4B is the rear view of the hand crank handle and the gear box according to one embodiment of the present invention.

According to one embodiment of the present invention, as shown in FIG. 4A and FIG. 4B, the hand crank handle (5) further comprises a crank gear wheel. The crank gear wheel is connected to the driver gear wheel (9) through the chain (11). When the hand crank handle (5) is rotated, the driving force can be transmitted to the driver gear wheel to drive the gear box.

Figure 5A:
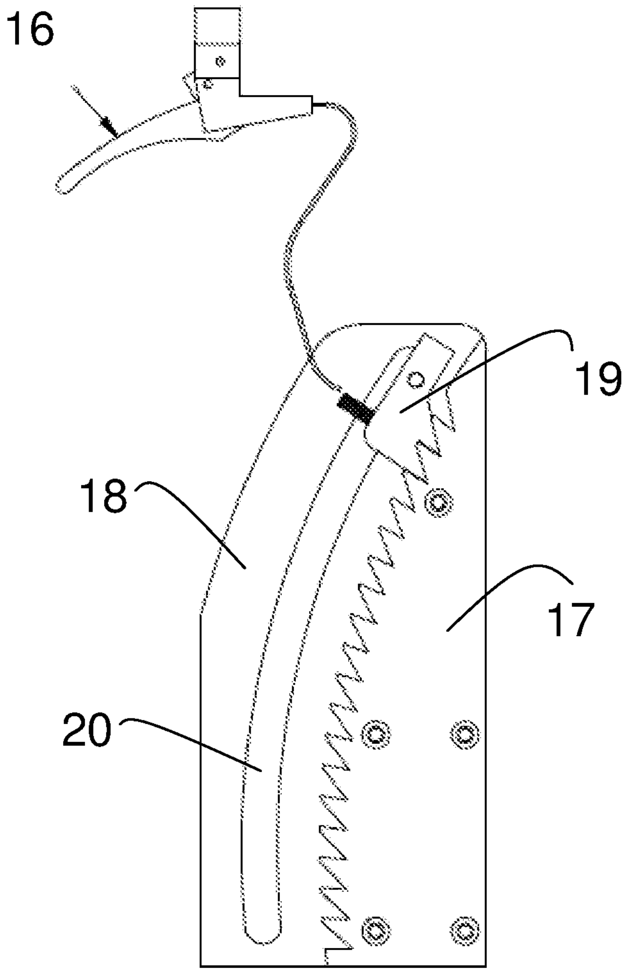
FIG. 5A is the front view of one of the seat reclining devices according to one embodiment of the present invention.
Figure 5B:
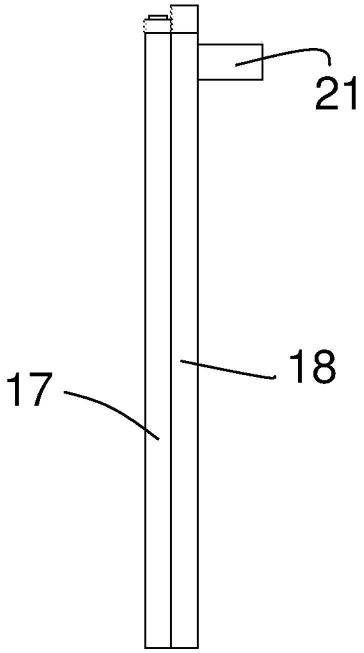
FIG. 5B is the left view of the seat reclining device according to one embodiment of the present invention.
Figure 5C:
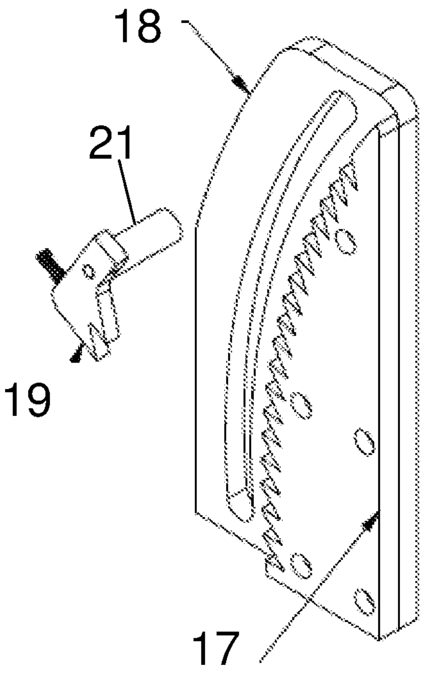
FIG. 5C is the exploded view of the seat reclining device according to one embodiment of the present invention.

According to one embodiment of the present invention, as shown in FIG. 5A and FIG. 5B, each of the seat reclining devices (3) comprises a clutch handle (16), toothed plate (17), positioning plate for toothed plate (18) and clutch teeth (19). The clutch handle (16) is connected to the clutch teeth (19); the positioning plate for toothed plate (18) is connected to the wheel chair bracket (7); and the toothed plate (17) is fixed onto the positioning plate for toothed plate (18). The positioning plate for toothed plate (18) includes a groove (20); the clutch teeth (19) include a projection (21) which can be concealed in the groove (20) of the positioning plate for toothed plate (18) and is connected to the seat (1). The clutch handle (16) can be disposed under the wheel chair handle. When the clutch handle (16) is pressed downwards, the clutch teeth (19) can move downwards along the teeth of the toothed plate (17) in order to adjust the inclination of the seat. The advantage is that through a plurality of slight movements of the clutch teeth (19) along the teeth of the toothed plate (17), the person propelling the wheel chair can still adjust the inclination of the seat (1) easily despite the heavy load produced by the wheel chair sitter.

Figure 6:
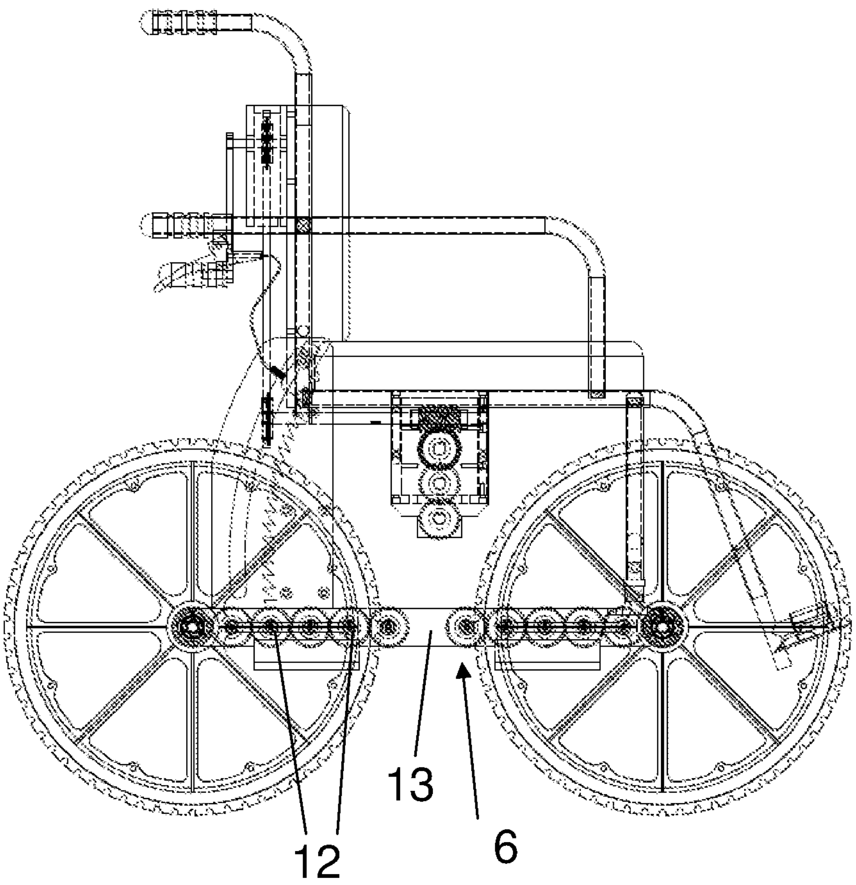
FIG. 6 is the perspective view of the manual stair climbing wheel chair according to one embodiment of the present invention.

FIG. 6 is the perspective view of the manual stair climbing wheel chair according to one embodiment of the present invention. By this perspective view, the recess (13) of the driven sprocket wheel set (6), position of the driven sprocket wheels (12) and their connection relationship can be visualized.

Although the present invention has been illustrated and described by figures, embodiments and/or examples, it can be understood that those skilled in the art may make changes to the embodiments without departing from the principles and spirit of the invention; therefore, the scope of the present invention is to be limited only by the appended claims and their equivalents.

What is claimed is:

1. A manual stair climbing wheel chair comprising:

a seat (1), front wheels (2*a*) and rear wheels (2*b*);

seat reclining devices (3), which are connected with the seat (1) and used to recline the seat (1)

a gear box (4) comprising gear wheels (8);

a hand crank handle (5), which is connected mechanically with the gear box (4);

a driven sprocket wheel set (6) comprising driven sprocket wheels (12) and a recess (13), wherein the driven gear set (6) is connected to the front wheels (2*a*) and the rear wheels (2*b*); the recess (13) is disposed between two of the driven sprocket wheels (12), wherein when the seat (1) of the wheel chair is reclined by using the seat reclining devices (3), the gear wheels (8) of the gear box (4) are disposed in the recess (13) of the driven sprocket wheel set (6) and engage with the driven sprocket wheels (12), so that the front wheels (2*a*) and rear wheels (2*b*) are driven by the gear box (4).

2. The wheel chair according to claim 1, wherein the gear box (4) further comprises a driver gear wheel (9); said driver gear wheel (9) is connected to the hand crank handle (5) through a chain (11).

3. The wheel chair according to claim 2, wherein the hand crank handle (5) comprises a crank gear wheel; said crank gear wheel is connected with the chain (11).

4. The wheel chair according to claim 1, wherein gear ratio of the gear box (4) is 1:30 to 1:40.

5. The wheel chair according to claim 1, wherein the gear box (4) further comprises a worm gear set (15) and a worm (14).

6. The wheel chair according to claim 1, wherein the gear box (4) is disposed at the bottom of the seat (1).

7. The wheel chair according to claim 1, wherein after adjustment by the seat reclining devices (3), the seat (1) is reclined at an angle of 35-45 degrees with respect to horizontal plane.

8. The wheel chair according to claim 1, wherein two of said seat reclining devices (3) are disposed on the left and right sides of the seat (1), respectively.

9. The wheel chair according to claim 1, wherein each of the seat reclining devices (3) comprises a clutch handle (16), toothed plate (17), positioning plate for toothed plate (18) and clutch teeth (19).

10. The wheel chair according to claim 9, wherein the clutch handle (16) is disposed under wheel chair handle.

11. The wheel chair according to claim 1, wherein the front wheels (2*a*) and rear wheels (2*b*) comprise anti-slip tires.

* * * * *